United States Patent
Barnard

[15] 3,653,710
[45] Apr. 4, 1972

[54] STORAGE COMPARTMENT LINER WITH INFLATABLE SUPPORT RIBS

[72] Inventor: Delbert J. Barnard, 4845 N.E. 42nd, Seattle, Wash. 98105

[22] Filed: Apr. 29, 1970

[21] Appl. No.: 32,976

[52] U.S. Cl.................296/39 R, 105/369 BA, 206/DIG. 30, 220/63 R
[51] Int. Cl.............................................B62d 33/04
[58] Field of Search..................296/1 R, 39; 280/150 R; 105/369 BA, 423; 206/DIG. 30; 220/63; 150/0.5; 214/10.5 D; 52/2

[56] References Cited

UNITED STATES PATENTS

| | | | |
|---|---|---|---|
| 2,898,146 | 8/1959 | Yudenfreund | 296/39 |
| 2,911,253 | 11/1959 | Dewey | 296/39 |
| 3,018,492 | 1/1962 | Rosen | 105/369 BA UX |
| 3,552,466 | 1/1971 | Fairchilds | 150/0.5 |
| 3,284,965 | 11/1966 | Michenfelder | 52/2 |

FOREIGN PATENTS OR APPLICATIONS

| | | | |
|---|---|---|---|
| 1,179,466 | 1/1970 | Great Britain | 206/DIG. 30 |

*Primary Examiner*—Benjamin Hersh
*Assistant Examiner*—Leslie J. Paperner
*Attorney*—Graybeal, Cole & Barnard

[57] ABSTRACT

The liner is of sheet fabric construction. It includes a bottom that is approximately the same size as the compartment floor. A side wall is provided on at least the sides and forward end. At least some of the walls include inflatable ribs for giving the side walls standup rigidity.

10 Claims, 4 Drawing Figures

PATENTED APR 4 1972 3,653,710

INVENTOR.
DELBERT J. BARNARD
BY Graybeal, Cole & Barnard
ATTORNEYS

STORAGE COMPARTMENT LINER WITH INFLATABLE SUPPORT RIBS

BACKGROUND OF THE INVENTION

1. Field of the Invention

The present invention relates to liners for storage compartments, and in particular motor vehicle cargo spaces, such as the rear compartment of a station wagon, for example.

2. Description of the Prior Art

Owners of station wagons frequently use them for hauling trash and yard trimmings to disposal stations. The cargo carrying compartments of most modern day station wagons are finished with fabric or composition materials. Unless the compartment is lined these materials can become easily cut (e.g. by rose bush thorns or barbs) or scarred. A lining is also desirable for keeping the cargo compartment clean. Small leaves, bush berries, twigs, etc. become dislodged and fall into, and become difficult to remove from, crevices and below the seats.

Usually the owner attempts to use a piece of canvas, a plastic tarp, a blanket, or the like, as a liner for the storage compartment. A disadvantage of this arrangement is that the tarp or blanket must be propped up on the sides and also at both the front and rear of the compartment. Otherwise, there is no cover for the upright boundaries of the compartment which are usually made of less durable materials than the floor and need protection the most. Also, even if the liner is initially successfully propped, the props are easily knocked down by the trash or other cargo as it is inserted into the compartment.

It is known to tie or otherwise anchor flexible wall liners within cargo carrying compartments of commercial vehicles. Examples are shown by U.S. Pat. No. 2,377,989, granted June 12, 1945, to Ernest J. Braun, and U.S. Pat. No. 2,803,491, granted Aug. 20, 1957, to Loren A. Brown.

These anchor-in liners are unsuitable for use in station wagons because station wagon cargo compartments do not include suitable fittings to which the liner may be anchored.

Hyman Yudenfreund, in his U.S. Pat. No. 2,898,146, granted Aug. 4, 1959, discloses a station wagon compartment liner composed of a plurality of rigid panels hinged together by elongated piano style hinges. The disadvantages of this type of liner are at least twofold. Firstly, the piano style hinges are easily bent and damaged. Secondly, a rigid liner is difficult to manipulate within the compartment and to remove from the compartment. This is particularly true when dirt and other small debris becomes wedged in the intrices of the hinges, rendering them difficult to operate.

SUMMARY OF THE INVENTION

Cargo compartment liners of the present invention are characterized by a limp bottom panel sized to substantially match the bottom dimensions of the compartment, and side walls. At least some of the side walls include inflatable tube-like compartments constructed and arranged to when inflated provide standup rigidity in the side walls. At the same time, and a very important feature of the invention, the liner is flexible enough, and will deform when twisted and wiggled, so that it can be easily repositioned while in the storage compartment, and can be pulled out of the compartment and emptied while the ribs are inflated.

This invention also relates to several different inflatable rib arrangements, and to several ways of connecting adjacent upright walls together.

These and other features of the invention are described below in reference to the drawing.

DESCRIPTION OF THE PREFERRED EMBODIMENTS

Figure 1:
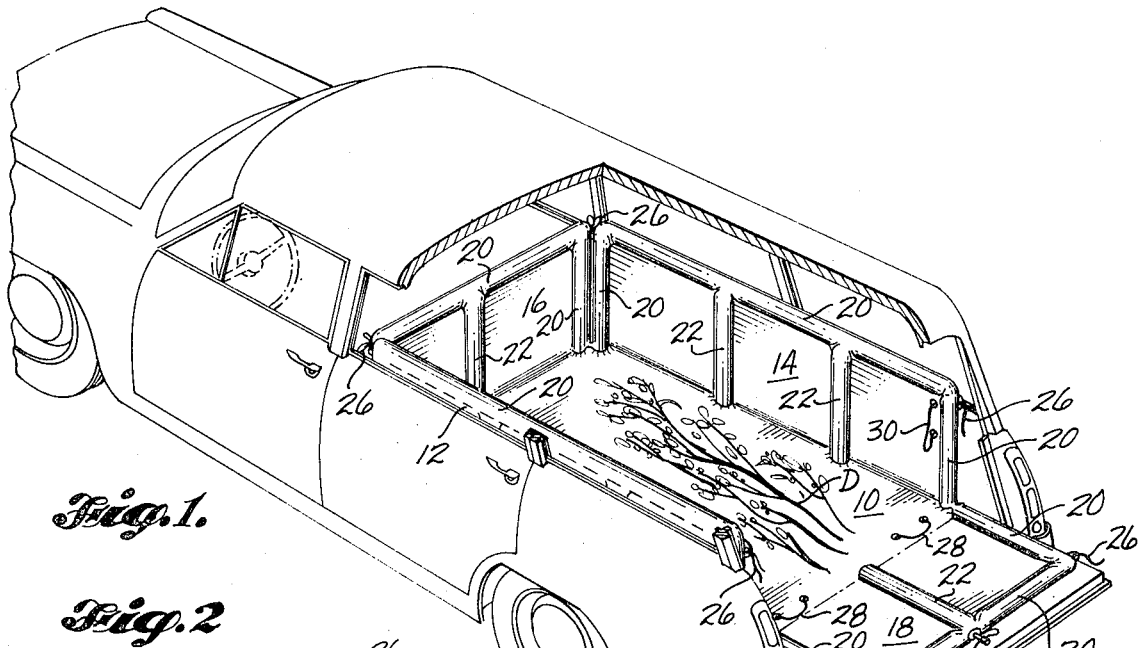
FIG. 1 is a top isometric view of a station wagon, with a portion of one side and the top cut away to show an inflatable liner typifying the invention.
Figure 2:
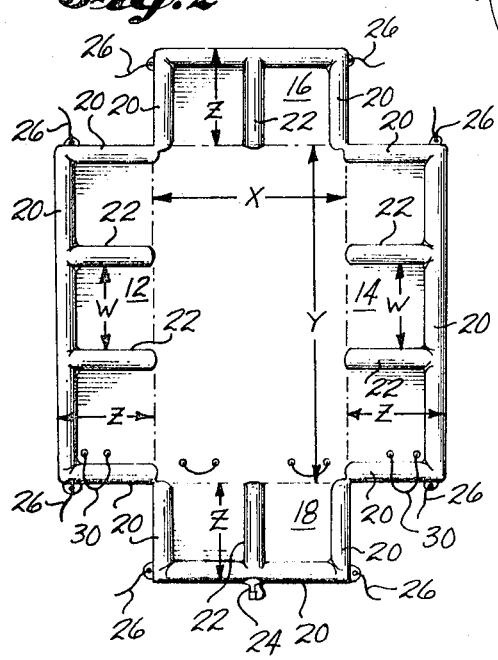
FIG. 2 is a plan view of the inflatable liner of FIG. 1, in a flat uninflated condition.

The liner of FIGS. 1 and 2 is shown to comprise a floor panel 10, a pair of side panels 12, 14, and a pair of end panels 16, 18. The floor panel 10 is dimensioned, in width X and in length Y, to closely approximate the width and length dimensions of the storage compartment of a station wagon type vehicle. The height or depth dimension of the side and end panels 12, 14, 16, 18 may be less than the height dimension of the storage compartment. However, the panels 12, 14, 16, 18 should at least be high enough to cover all of the interior trim materials used in the storage compartment below the glass level.

According to the invention inflatable ribs are incorporated in at least some of the side panels 12, 14, 16, 18, for the purpose of giving such side panels form or body so that they are self-standing within the storage compartment. A typical and particularly advantageous design and arrangement of the support ribs is shown in FIGS. 1 and 2. In this embodiment a continuous tubular passageway 20 extends around the entire periphery of the liner. As shown by FIG. 2, the passageway 20 traverses the border portions of the panels 12, 14, 16, 18 which are not connected to the floor panel 10. The passageway 20 forms both beams and ribs. Additional ribs 22, communicating at their upper ends with the beam portions at passageway 20 and closed at their lower end, may be provided in at least the side panels 12, 14, to provide additional stiffness.

The liner panels 10, 12, 14, 16, 18 may be constructed from any suitable material that is impervious to air, at least in the regions of the inflatable beams and ribs 20, 22, and a sufficient flexibility to permit easy movement of the liner when inflated and easy folding of the liner when deflated. The liner should have a relatively tough outer skin which is not easily puncturable by rose bush barbs or the like.

Figure 4:
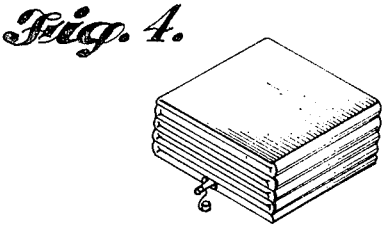
FIG. 4 is a top isometric view showing the liner in a folded condition.

In the embodiment of FIGS. 1 and 2, a single fill opening 24 is provided in the top beam 20 of the rear panel 18. This fill opening 24 may be in the form of a tubular stem having a closure cap, such as is conventionally used in air mattresses and inflatable cushions (e.g. as is shown in detail in FIG. 4 of U.S. Pat. No. 3,253,861, granted May 31, 1966 to Howard S. Howard). If desired the various inflatable ribs and beams 20, 22 could be divided into two or more sections, with each section being provided with a separate inlet tube.

A length of cord 26 is shown incorporated into each outer corner of each panel 12, 14, 16, 18. As shown by FIG. 1, prior to use the cords 26 of adjacent corners are tied together to form the inflated side and end panels, and the floor panel, into a rectangular box-like structure.

Some station wagons have laterally inwardly projecting wheel wells in their storage compartments. To better accomodate the wheel well, the spaces W between intermediate ribs 22 of the side panels 12, 14 are made to exceed in width the length of the wheel well somewhat, so that in use the wheel wells lie in the flat fabric region between such ribs 22. For use with some station wagons, it may be necessary or at least desirable to curve one or both of the intermediate ribs 22 somewhat, for the purpose of accomodating the wheel well.

Preparatory to use the beams and ribs 20, 22 are inflated, the forward cords 26 are tied together, and the liner is inserted into the storage compartment from the rear opening of the station wagon, normally closed by a tail gate TG. Then the garden trimmings or other debris D is loaded into the storage compartment, within the confines of the liner. Following loading the rear panel 18 is raised and is tied in place, and the tail gate TG is also raised and secured in place.

At the unloading site the tail gate TG and the rear panel 18 are lowered and the storage compartment is unloaded. In many instances the unloading procedure may involve the user grasping the handles 28, 30 and pulling the liner and its contents D completely out from the storage compartment. The inherent flexibility of the liner makes it possible to twist, turn and bend the inflated and loaded liner as necessary, during this removal procedure.

After the debris D is unloaded the beams and ribs 20, 22 are deflated and the liner is shaken and swept if necessary. It is then folded up into a compact package for storage (FIG. 4) in a similar fashion to the way a blanket would be folded.

In some installations it might be desirable to dispense with the rear panel altogether, particularly when the inner surface of the tail gate TG is itself constructed from a tough, wear-resistant material. As another modification, the rear panel 18 may be made to be a continuation of the bottom panel 10, so that it does not stand up but merely lays limp as a drape or cover for the tail gate. This is a particularly useful arrangement when the load being carried prevents closing of the tail gate.

Another way of constructing the liner of FIGS. 1 and 2 is to make the beams and ribs 20, 22 from a continuous, tubular inflatable member, separate from the liner itself, and then form pockets in the liner into which the tubular can be inserted and secured.

Figure 3:
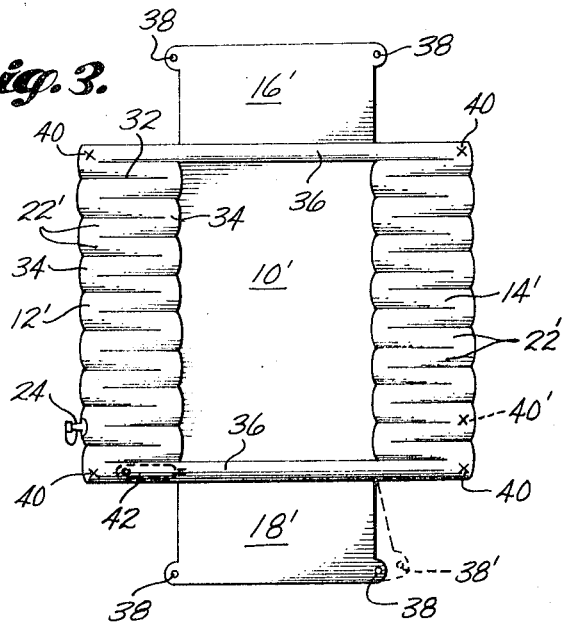
FIG. 3 is a view like FIG. 2, but of a modified form of liner.

In the embodiment of FIG. 3 the front and rear panels 16', 18', as well as the bottom panel 10', are constructed to be limp or nonself-standing (i.e. they do not include inflatable stiffening ribs). Instead, all stiffening ribs are incorporated in the side panels 12', 14', and such supported side panels 12', 14' in turn support the two end panels 16', 18'. By way of typical example, the inflatable ribs may comprise a plurality of side-by-side placed tubular compartments, some of which are designated 22'. The material forming the pockets 22' is sealed along a line 32, between the pockets 22'. A communicating passageway 34 is provided between each pair of pockets 22' on an alternating end basis, as is illustrated. The endmost ribs 22' of each side panel 12', 14' may be extended across the bottom panel 10', so that the two side sets of inflatable ribs 22' are interconnected and only a single air inlet 24 is needed.

In the embodiment of FIG. 3 the cords or tie members 26 are replaced by snap fasteners. The box portions 38 of the fasteners may be mounted on flap-like ears on the outer corners of the end panels 16', 18', with the pin portions 40 being secured to the side panels 12', 14', near the outside corners thereof. As shown by broken lines in FIG. 3, the ends of the flaps 16', 18', may be widened out to form a flap which overlaps a substantial corner portion of the adjacent side panel 12', 14'. The amount of overlap is indicated by the new location of the pin portion 40'.

In some installations it may be desirable to provide zippers along the corner forming boundaries of the panels, for connecting the panels together, in lieu of using either tie members 26 or box-pin snap fasteners 38, 40.

A foot operated pump 42 may be incorporated into one of the ribs 22', and used for inflating the ribs 22'. By way of typical and therefore nonlimitive example, the pump may be of the type shown by U.S. Pat. No. 3,155,991, granted Nov. 10, 1964, to Philip N. Dunham.

In all forms of the invention the walls of the inflatable pockets are formed from a material which will not stretch in response to inflation, or will only stretch a limited amount, so that such pockets can be pressurized.

Although only two embodiments of the present invention have been disclosed and described in detail, it will be appreciated that other specific arrangements could be provided by a person skilled in the art which would serve equally well for the purpose intended, and would fall within the scope of the invention as defined in the following claims.

What is claimed is:

1. A storage compartment of a motor vehicle having a floor and generally upright side boundaries, and a liner comprising a generally pliable fabric member including a generally pliable bottom panel positionable on the floor of the storage compartment and generally pliable fabric side panel means connected to said bottom panel by fabric folds, said side panel means including inflatable support strut means which when inflated provide the side wall means with self-supporting standup rigidity, and resulting in a liner which is relatively distortable in total, including where the side wall means join the bottom panel.

2. The structure of claim 1, wherein said side panel means comprises panels each including the said inflatable support strut means.

3. The structure claim 1, wherein the support strut means comprises a plurality of parallel tubular chambers incorporated in the side panels means of the fabric member, which chambers are generally upright during use.

4. The structure of claim 3, wherein the side panel means further including elongated inflatable support beam means which in use is horizontally disposed, defines an upper edge of the liner, and communicates with the upper ends of the support struts.

5. The structure of claim 4, wherein said side panel means includes at least two opposed side panels having a plurality of generally parallel support struts communicating at their upper end with a said elongated inflatable support beam, and the liner includes inflatable chambers interconnected between the lower ends of the opposed struts at the opposite ends of the liner.

6. The structure of claim 4, wherein said side panel means includes at least two opposed side panels in which the said struts are incorporated, and at least one additional side wall which is generally perpendicular to the opposed side walls and in use spans between the two ends of the opposed side panels at one end of the liner, and fastener means for securing the several side panels together generally where they meet and form a corner.

7. The structure of claim 1, wherein said side panel means comprises a pair of opposed side panels, each of which includes an inflatable support strut at each of its ends, and wherein said liner includes at least one end panel and fastener means for connecting the end panel to the sides panels after all three panels have been raised into generally upright positions.

8. The structure of claim 7, wherein said side panels each comprise an inflatable beam extending between and interconnecting the said support struts at the ends of said panels.

9. The structure of claim 8, wherein the side panels include a plurality of intermediate inflatable support struts located between the said support struts at the ends of the side panels, said intermediate support struts also communicating with the inflatable beam.

10. The structure of claim 1, wherein said bottom panel is sized to closely match the floor dimensions of the storage compartment within the vehicle, which storage compartment has side walls, and said side panel means are sized, so that such side panel means extends upwardly in the storage compartment a distance providing cover and protection for a substantial portion of said side walls.

* * * * *